United States Patent
Harris

(10) Patent No.: US 9,096,175 B1
(45) Date of Patent: Aug. 4, 2015

(54) SPLIT SCREEN REAR VIEW DISPLAY

(71) Applicant: Ervin Harris, Smithfield, NC (US)

(72) Inventor: Ervin Harris, Smithfield, NC (US)

( * ) Notice: Subject to any disclaimer, the term of this patent is extended or adjusted under 35 U.S.C. 154(b) by 310 days.

(21) Appl. No.: 13/644,400

(22) Filed: Oct. 4, 2012

(51) Int. Cl.
*H04N 7/18* (2006.01)
*B60R 1/00* (2006.01)

(52) U.S. Cl.
CPC . *B60R 1/00* (2013.01); *H04N 7/181* (2013.01)

(58) Field of Classification Search
CPC .... B60R 1/00; B60R 2300/105; B60R 11/04; B60R 2300/802; H04N 7/181; H04N 7/18; G06K 9/00771; G06K 9/00; G08B 13/196
USPC .......................................................... 348/148
See application file for complete search history.

(56) References Cited

U.S. PATENT DOCUMENTS

| | | | |
|---|---|---|---|
| 6,184,781 B1 * | 2/2001 | Ramakesavan | 340/435 |
| 6,314,364 B1 * | 11/2001 | Nakamura | 701/515 |
| 2002/0149544 A1 * | 10/2002 | Rosen et al. | 345/6 |
| 2003/0137586 A1 * | 7/2003 | Lewellen | 348/148 |
| 2005/0040939 A1 * | 2/2005 | Jobes et al. | 340/438 |
| 2007/0132567 A1 * | 6/2007 | Schofield et al. | 340/438 |
| 2008/0309762 A1 * | 12/2008 | Howard et al. | 348/148 |
| 2009/0187300 A1 * | 7/2009 | Everitt et al. | 701/29 |
| 2011/0001825 A1 * | 1/2011 | Hahn | 348/148 |
| 2012/0200664 A1 * | 8/2012 | Lang et al. | 348/36 |
| 2012/0296522 A1 * | 11/2012 | Otuka | 701/41 |

* cited by examiner

Primary Examiner — Shan Elahi

(57) ABSTRACT

The present invention features a split screen rear view system for a vehicle driver for improved road situation viewing. The system includes a left rear view camera installed on left side mirror, a right view camera installed on right side mirror, a central camera installed on rear side of a vehicle and a display monitor installed within the vehicle where the driver can view conveniently, such as the position of the traditional rear review mirror. The display monitor has a split screen which as three display areas aligned to display the images sending from the cameras respectively. The system also comprises radar sensors installed near each camera to measure the closest vehicle relative speed with the additional input of the speed information from either the vehicle on-board signal or built-in GPS receiver. The relative speed information is also displayed on each split display area.

3 Claims, 5 Drawing Sheets

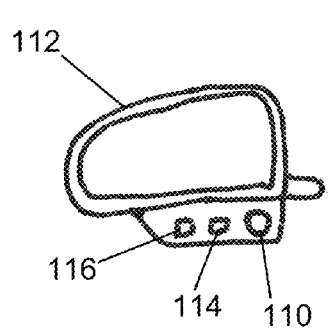
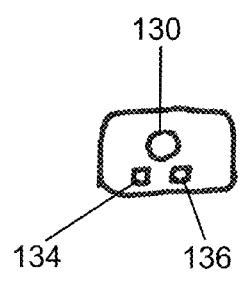
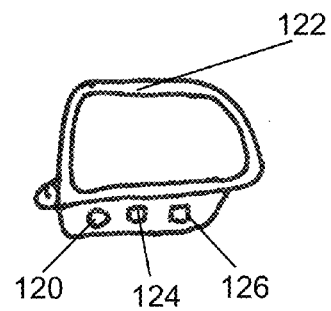
FIG. 5　　　　　FIG. 6　　　　　FIG. 7
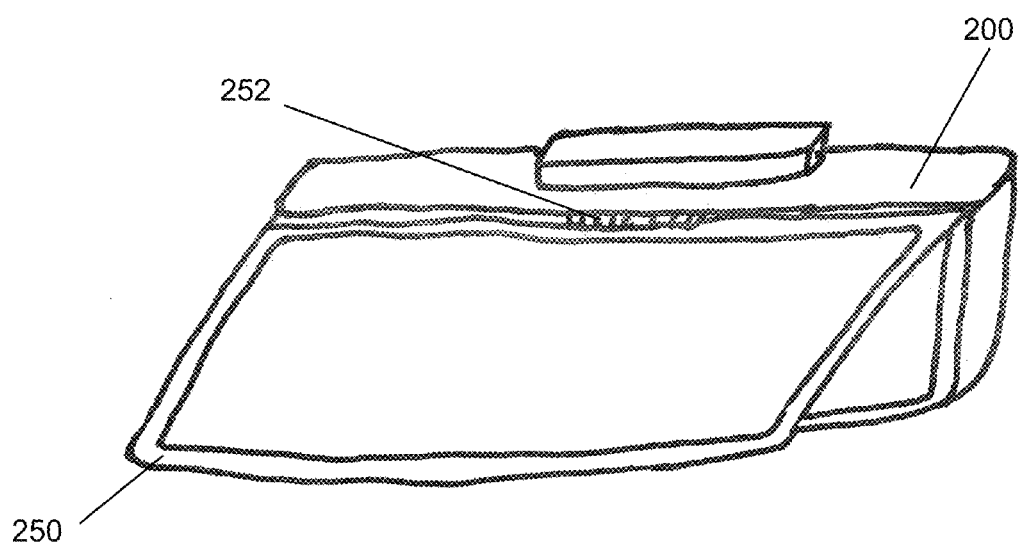
FIG. 8

US 9,096,175 B1

SPLIT SCREEN REAR VIEW DISPLAY

FIELD OF THE INVENTION

The present invention related to a split screen rear view display, and more particularly to a split screen rear view display inside a vehicle for improved road situation viewing.

BACKGROUND OF THE INVENTION

Current vehicles cannot provide a comprehensive rear view of road situation on both sides behind the vehicle. The separation of the left and right side review mirror and center review mirrors make it hard for a vehicle driver to view all mirrors simultaneously. There is a need for a display system which is capable of providing a comprehensive rear view of road situation on both sides behind the vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE DRAWINGS

The present invention features a split screen rear view system for a vehicle driver for improved road situation viewing. The system includes a left rear view camera installed on left side mirror, a right view camera installed on right side mirror, a central camera installed on rear side of a vehicle and a display monitor installed within the vehicle where the driver can view conveniently, such as the position of the traditional rear review mirror. The display monitor has a split screen which as three display areas aligned to display the images sending from the cameras respectively. The system also comprises radar sensors installed near each camera to measure the closest vehicle relative speed with the additional input of the speed information from either the vehicle on-board signal or built-in GPS receiver. The relative speed information is also displayed on each split display area.

BRIEF DESCRIPTION OF THE DRAWINGS

Figure 1:
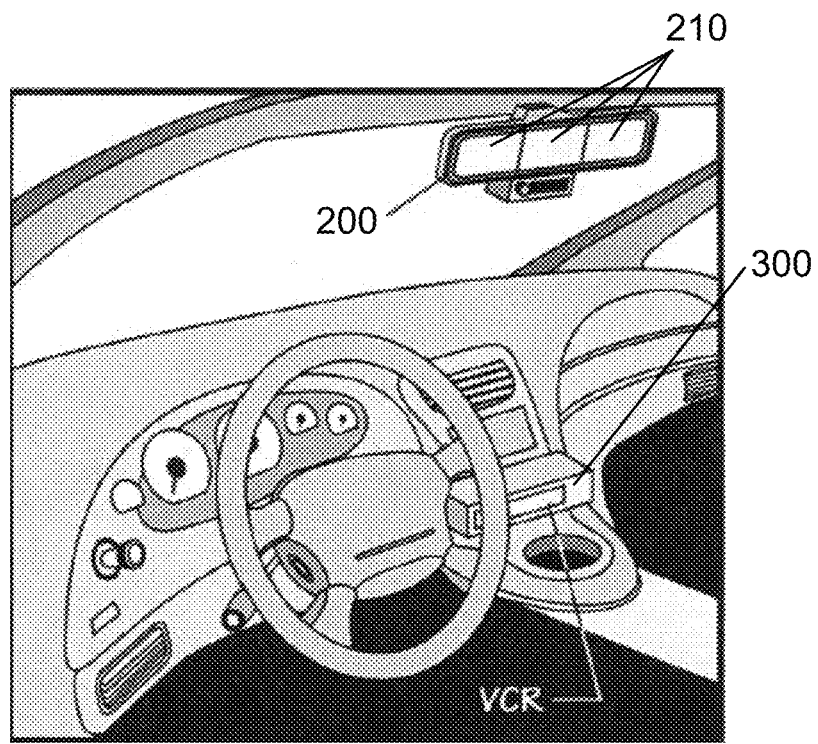
Figure 2:
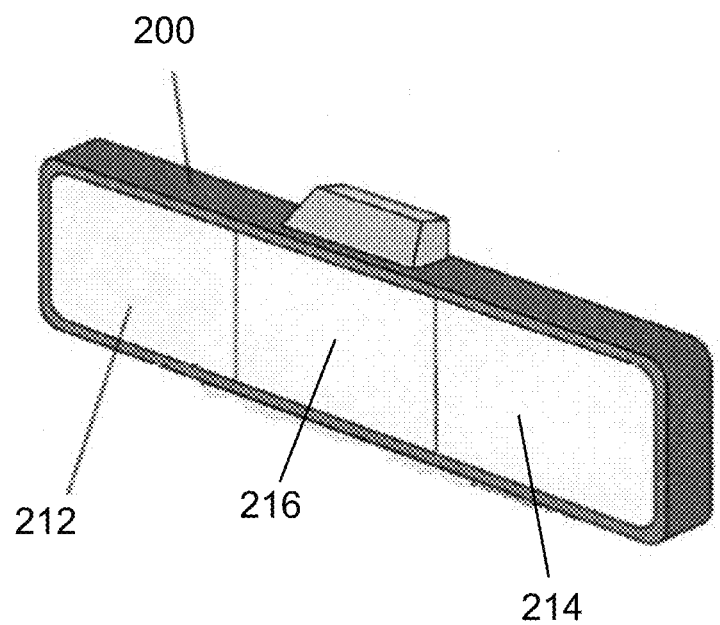
Figure 3:
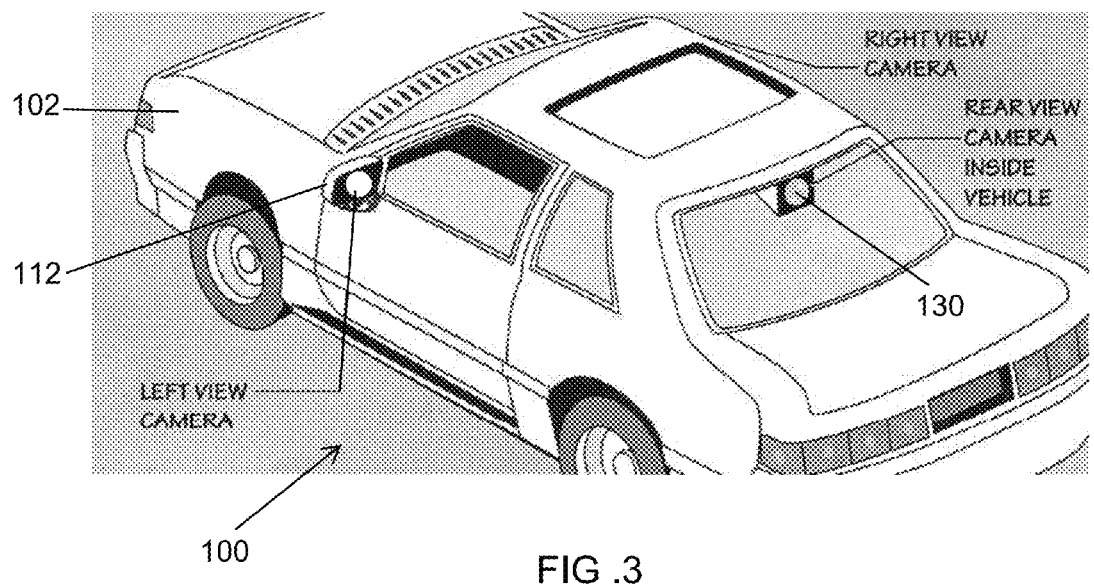
Figure 4:
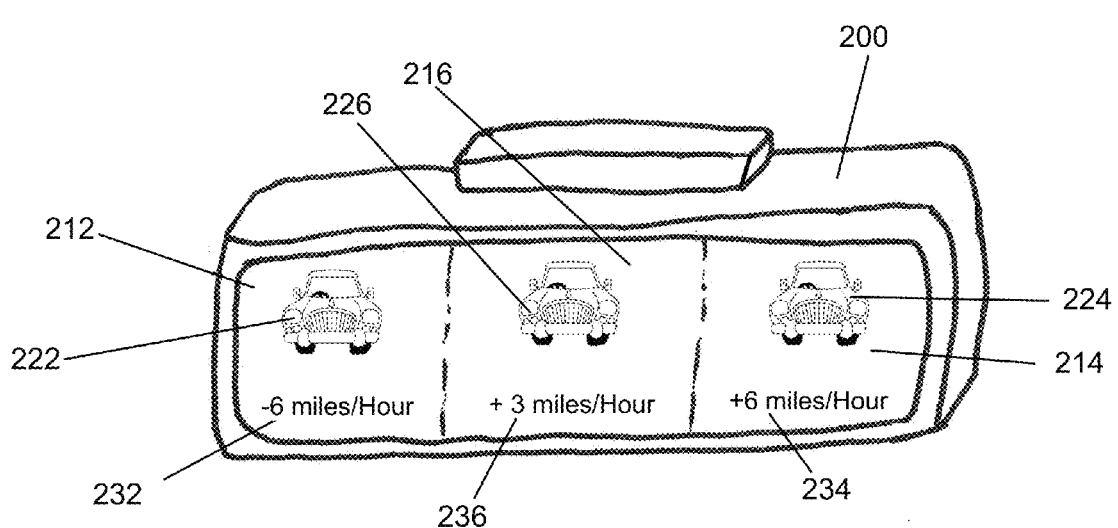
Figure 9:
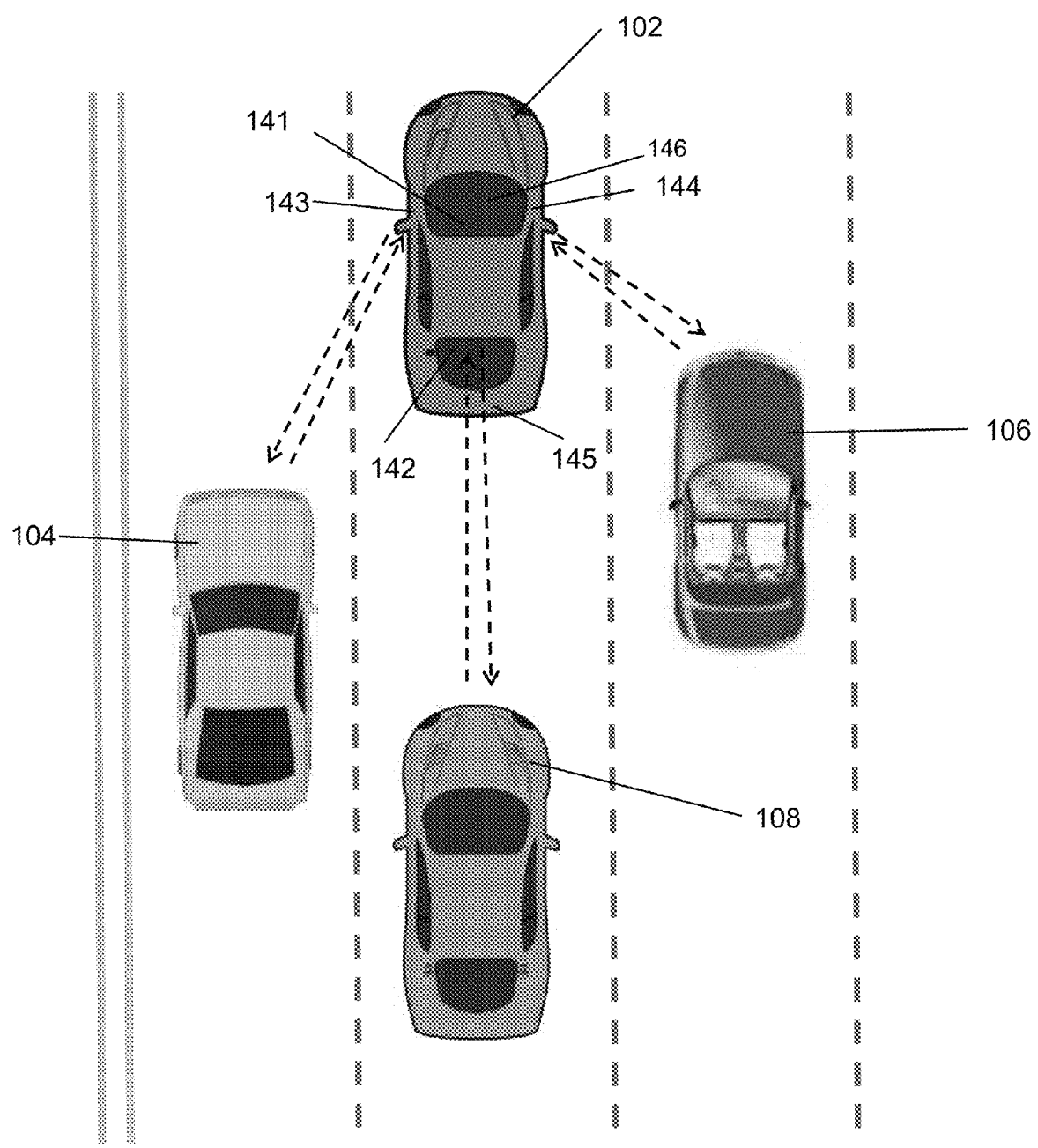
Figure 10:
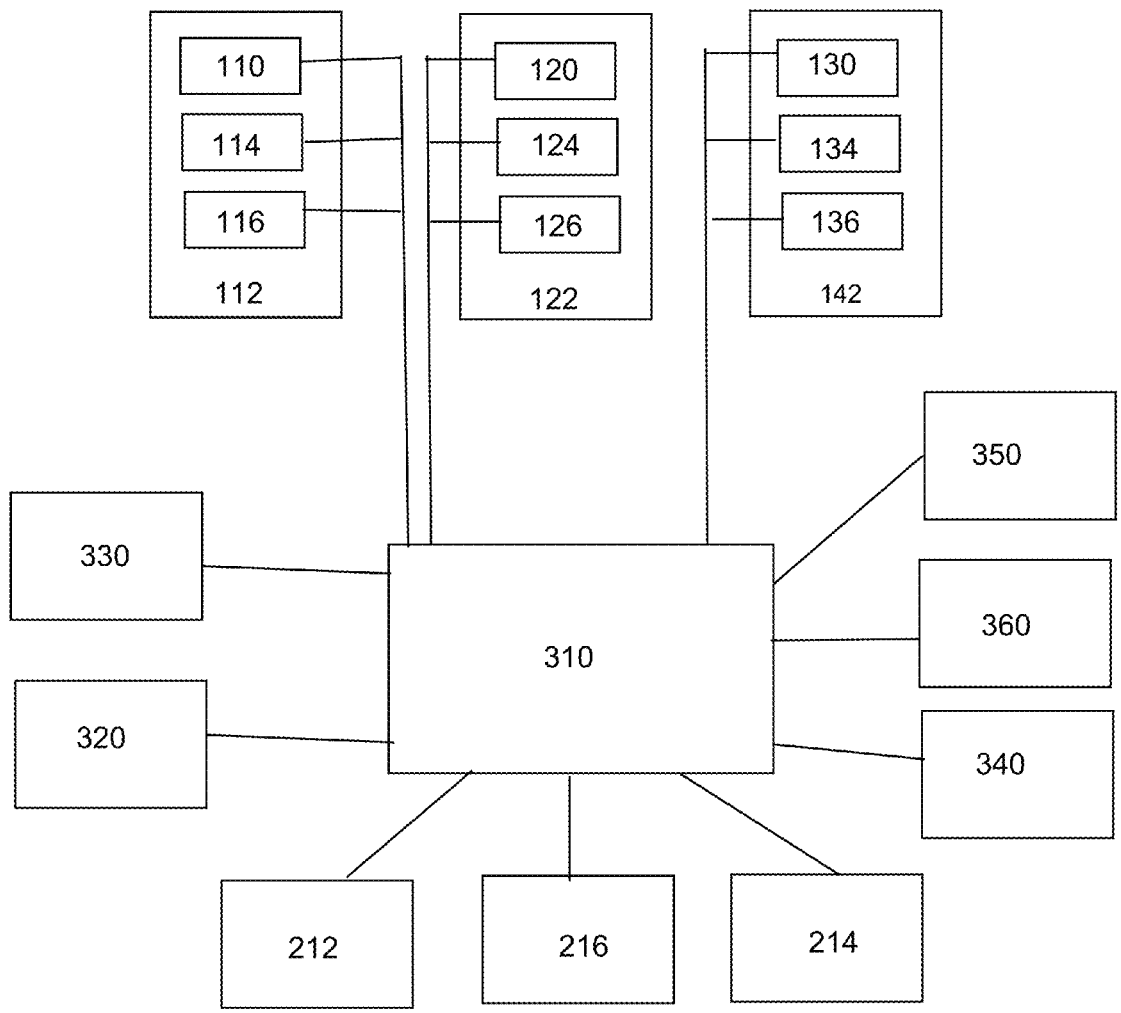

FIG. 1 shows an interior view of a vehicle with split screen rear view system.
FIG. 2 shows a close-up review of the split screen display.
FIG. 3 shows an exterior view of a vehicle with split screen rear view system.
FIG. 4 shows an in-use review of the split screen display.
FIG. 5 shows a close-up view of a first rear view side mirror
FIG. 6 shows a close-up view of a third rear view camera.
FIG. 7 shows a close-up view of a second rear view side mirror.
FIG. 8 shows a close-up review of the split screen display with flip-up mirror.
FIG. 9 shows an in-use review of the split screen rear view system on a vehicle.
FIG. 10 shows a block-diagram view of the split screen rear view system.

DESCRIPTION OF PREFERRED EMBODIMENTS

Referring now to FIG. 1-5, the present invention features a split screen rear view system for a vehicle driver for improved road situation viewing. The system includes a left rear view camera installed on left side mirror, a right view camera installed on right side mirror, a central camera installed on rear side of a vehicle and a display monitor installed within the vehicle where the driver can view conveniently, such as the position of the traditional rear review mirror. The display monitor has a split screen which as three display areas aligned to display the images sending from the cameras respectively. The system also comprises radar sensors installed near each camera to measure the closest vehicle relative speed with the additional input of the speed information from either the vehicle on-board signal or built-in GPS receiver. The relative speed information is also displayed on each split display area.

The split screen rear view system (100) for a vehicle driver for improved road situation viewing, the system a vehicle (102) having a cabin with cabin front end (141) and cabin rear end (142), a first side (143), a second side (144) and a vehicle rear side (145), and a camera rear view system installed on the vehicle (102).

The camera rear view system comprises a first rear view camera (110), a second rear view camera (120), a third rear view camera (130) and a display monitor (200). The first rear view camera (110) is installed on first side mirror (112) on the vehicle first side (143) to capture video images behind vehicle on the first side. The second rear view camera (120) is installed on second side mirror (122) on the vehicle second side (144) to capture video images behind vehicle on the second side. The third rear view camera (130) installed on vehicle rear side (145) or cabin rear side (142) to capture video images right behind vehicle. The display monitor (200) is installed inside the vehicle cabin at cabin front end (141), wherein the display monitor has a split screen (210) with a first display area (212), a second display area (214) and a third display area (216), wherein the three display areas are aligned horizontally with the third display (216) in the middle between the first display area (212) and the second display area (214), where the display monitor (200) comprises a microprocessor module (310).

The microprocessor module (310) is operatively connected to the first rear view camera, second rear view camera, third rear view camera, split screen (210), wherein the microprocessor module (310) receives a first video image (222) input from the first rear view camera (110) and subsequently sends a first signal carrying the first video image to the split screen (210), wherein the first video image (222) is displayed on the first display area (212), wherein the microprocessor module (310) receives a second video image (224) input from the second rear view camera (120) and subsequently sends a second signal carrying the second video image to the split screen (210), wherein the second video image (224) is displayed on the second display area (214), wherein the microprocessor module (310) receives a third video image (226) input from the third rear view camera (130) and subsequently sends a third signal carrying the third video image to the split screen (210), wherein the third video image (226) is displayed on the third display area (216).

In some embodiments, the display monitor (200) further comprise a mirror (250), wherein the mirror is pivotably attached to the display monitor (200) via a hinge (252) disposed on a top edge of the monitor (200), wherein when the mirror flips down, the display monitor (200) functions as a stand rear view mirror, wherein the mirror flips up, the display monitor (200) functions as a split screen display.

In some embodiments, the display monitor (200), the first rear view camera, second rear view camera and third rear view camera are powered by vehicle on board electrical power source (320). In some embodiments, the display monitor (200) is powered by an internal battery (330).

In some embodiments, the third rear view camera (130) is installed on trunk lid, rear bumper or adjacent to rear license plate at the vehicle rear side (145). In some embodiments, the microprocessor module (310) comprises an internal memory to store temporary data.

In some embodiments, the rear view system (100) further comprises a first radio transmitter (114) and a first radio receive led on first side mirror 112), a second radio transmitter (124) and a second radio receiver (126) installed on second side mirror (122), a third radio transmitter (134) and a third radio receiver (136) installed adjacent to the third rear view camera (130). The first radio transmitter (114), first radio receiver (116), second radio transmitter (124), second radio receiver (126), third radio transmitter (134) and third radio receiver (136) all operatively connect to the microprocessor module (310).

The microprocessor module (310) instructs the first radio transmitter (114) to emit a first radio signal toward left rear direction, wherein the first radio receiver (116) receives a first echo signal from a vehicle (104) on the left side behind the vehicle (102), wherein the first radio receiver (116) forward the first echo signal to the microprocessor module (310), wherein the microprocessor module (310) compares the first radio signal, first echo signal and the speed of the vehicle (102) to calculate a first relative speed between the vehicle (104) and vehicle (102), wherein the first relative speed is the remaining after vehicle (102) speed subtracted by vehicle (104) speed, wherein the microprocessor module (310) sends the first relative speed signal (232) to the split screen (210) and instructs the signal displayed on the first display area (212).

The microprocessor module (310) instructs the second radio transmitter (124) to emit a second radio signal towards right rear direction, wherein the second radio receiver (126) receives a second echo signal from a vehicle (106) on the right side behind the vehicle (102), wherein the second radio receiver (126) forward the second echo signal to the microprocessor module (310), wherein the microprocessor module (310) compares the second radio signal, second echo signal and the speed of the vehicle (102) to calculate a second relative speed between the vehicle (106) and vehicle (102), wherein the second relative speed is the remaining after vehicle (102) speed subtracted by vehicle (106) speed, wherein the microprocessor module (310) sends the second relative speed signal (234) to the split screen (210) and instructs the signal displayed on the second display area (214).

The microprocessor module (310) instructs the third radio transmitter (134) to emit a third radio signal toward rear direction, wherein the third radio receiver (136) receives a third echo signal from a vehicle (104) on the left side behind the vehicle (102), wherein the third radio receiver (136) forward the third echo signal to the microprocessor module (310), wherein the microprocessor module (310) compares the third radio signal, third echo signal and the speed of the vehicle (102) to calculate a third relative speed between the vehicle (108) and vehicle (102), wherein the third relative speed is the remaining after vehicle (102) speed subtracted by vehicle (108) speed, wherein the microprocessor module (310) sends the third relative speed signal (236) to the split screen (210) and instructs the signal displayed on the third display area (216).

In some embodiments, the speed of the vehicle (102) is input from on board vehicle speed information (360) of vehicle (102). In some embodiment, the speed of the vehicle (102) is input from a built-in GPS receiver (340) disposed within the display monitor (200), wherein the GPS receiver (340) is operatively connected to the microprocessor module (310).

In some embodiment, if vehicle (104) speed is higher than vehicle (102) speed, the first relative speed signal is displayed as red color, wherein if vehicle (104) speed is lower than vehicle (102) speed, the first relative speed signal is displayed as green color, wherein if vehicle (106) speed is higher than vehicle (102) speed, the second relative speed signal is displayed as red color or other colors with tendency to associate with caution or possible danger, wherein if vehicle (106) speed is lower than vehicle (102) speed, the second relative speed signal is displayed as green color or other colors associated with safety or no imposing danger, wherein if vehicle (108) speed is higher than vehicle (102) speed, the third relative speed signal is displayed as red color, wherein if vehicle (108) speed is lower than vehicle (102) speed, the third relative speed signal is displayed as green color.

In some embodiment, if vehicle (104) speed is higher than vehicle (102) speed, the first relative speed signal is displayed as a negative number, wherein if vehicle (104) speed is lower than vehicle (102) speed, the first relative speed signal is displayed as a positive number, wherein if vehicle (106) speed is higher than vehicle (102) speed, the second relative speed signal is displayed as a negative number, wherein if vehicle (106) speed is lower than vehicle (102) speed, the second relative speed signal is displayed as a positive number, wherein if vehicle (108) speed is higher than vehicle (102) speed, the third relative speed signal is displayed as a negative number, wherein if vehicle (108) speed is lower than vehicle (102) speed, the third relative speed signal is displayed as a positive number.

In some embodiment, the microprocessor module (310) can also calculate a first distance between vehicle (104) and vehicle (102) by analyzing the signals of first radio signal and first echo signal via means like time delay analysis, and send the distance signal to be displayed on the first display area (212) together with the first relative speed information (232). The microprocessor module (310) can also calculate a second distance between vehicle (104) and vehicle (106) by analyzing the signals of second radio signal and second echo signal via means like time delay analysis, and send the second distance signal to be displayed on the second display area (214) together with the second relative speed information (232). The microprocessor module (310) can also calculate a third distance between vehicle (106) and vehicle (102) by analyzing the signals of third radio signal and third echo signal via means like time delay analysis, and send the third distance signal to be displayed on the third display area (216) together with the third relative speed information (232).

In some embodiment, the system further comprise a recorder (350), wherein the recorder (350) is operatively connected to the microprocessor module (310), wherein the microprocessor module (310) sends the video images of the first rear view camera (110), the second rear view camera (120) and the third rear view camera (110) to the recorder (350) to be saved. The recorded video images can be used for training purposes or for accident responsibility analysis in case of accident happened.

In some embodiment, the recorder (350) is a videocassette recorder, digital video disk (DVD) recorder, an internal hard driver, or a memory card writer. In some embodiment, the recorder (350) is disposed within center dash of the vehicle (102), within the display monitor (200), or inside the trunk of the vehicle (102).

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A split screen rear view system for a vehicle driver for improved road situation viewing, the system comprising:
   (i) a vehicle having a cabin with cabin front end and cabin rear end, a first side, a second side and a vehicle rear side, wherein the cabin front end is located at or near a vehicle windshield;
   (ii) a camera rear view subsystem installed on the vehicle, wherein the camera rear view system comprising:
      (a) a first rear view camera installed on first side mirror on the vehicle first side to capture video images behind vehicle on the first side;
      (b) a second rear view camera installed on second side mirror on the vehicle second side to capture video images behind vehicle on the second side;
      (c) a third rear view camera installed on vehicle rear side or cabin rear side to capture video images right behind vehicle;
      (d) a display monitor installed inside the vehicle cabin at cabin front end, wherein the display monitor has a split screen with a first display area, a second display area and a third display area, wherein the three display areas are aligned horizontally with the third display in the middle between the first display area and the second display area, where the display monitor comprises a microprocessor module; and
   (iii) a first radio transmitter and a first radio receiver installed on first side mirror;
   (iv) a second radio transmitter and a second radio receiver installed on second side mirror;
   (v) a third radio transmitter and a third radio receiver installed adjacent to the third rear view camera;
wherein the microprocessor module is operatively connected to the first rear view camera, second rear view camera, third rear view camera, split screen, wherein the microprocessor module receives a first video image input from the first rear view camera and subsequently sends a first signal carrying the first video image to the split screen, wherein the first video image is displayed on the first display area, wherein the microprocessor module receives a second video image input from the second rear view camera and subsequently sends a second signal carrying the second video image to the split screen, wherein the second video image is displayed on the second display area, wherein the microprocessor module receives a third video image input from the third rear view camera and subsequently sends a third signal carrying the third video image to the split screen, wherein the third video image is displayed on the third display area;

wherein the first radio transmitter, first radio receiver, second radio transmitter, second radio receiver, third radio transmitter and third radio receiver all operatively connect to the microprocessor module;

wherein the microprocessor module instructs the first radio transmitter to emit a first radio signal toward left rear direction, wherein the first radio receiver receives a first echo signal from a vehicle on the left side behind the vehicle, wherein the first radio receiver forward the first echo signal to the microprocessor module, wherein the microprocessor module compares the first radio signal, first echo signal and the speed of the vehicle to calculate a first relative speed between the vehicle and vehicle, wherein the first relative speed is the remaining after vehicle speed subtracted by vehicle speed, wherein the microprocessor module sends the first relative speed signal to the split screen and instructs the signal displayed on the first display area;

wherein the microprocessor module instructs the second radio transmitter to emit a second radio signal towards right rear direction, wherein the second radio receiver receives a second echo signal from a vehicle on the right side behind the vehicle, wherein the second radio receiver forward the second echo signal to the microprocessor module, wherein the microprocessor module compares the second radio signal, second echo signal and the speed of the vehicle to calculate a second relative speed between the vehicle and vehicle, wherein the second relative speed is the remaining after vehicle speed subtracted by vehicle speed, wherein the microprocessor module sends the second relative speed signal to the split screen and instructs the signal displayed on the second display area; and wherein the microprocessor module instructs the third radio transmitter to emit a third radio signal toward rear direction, wherein the third radio receiver receives a third echo signal from a vehicle on the left side behind the vehicle, wherein the third radio receiver forward the third echo signal to the microprocessor module, wherein the microprocessor module compares the third radio signal, third echo signal and the speed of the vehicle to calculate a third relative speed between the vehicle and vehicle, wherein the third relative speed is the remaining after vehicle speed subtracted by vehicle speed, wherein the microprocessor module sends the third relative speed signal to the split screen and instructs the signal displayed on the third display area.

2. The system of claim 1, wherein if vehicle speed is higher than vehicle speed, the first relative speed signal is displayed as red color, wherein if vehicle speed is lower than vehicle speed, the first relative speed signal is displayed as green color, wherein if vehicle speed is higher than vehicle speed, the second relative speed signal is displayed as red color, wherein if vehicle speed is lower than vehicle speed, the second relative speed signal is displayed as green color, wherein if vehicle speed is higher than vehicle speed, the third relative speed signal is displayed as red color, wherein if vehicle speed is lower than vehicle speed, the third relative speed signal is displayed as green color.

3. The system of claim 1, wherein if vehicle speed is higher than vehicle speed, the first relative speed signal is displayed as a negative number, wherein if vehicle speed is lower than vehicle speed, the first relative speed signal is displayed as a positive number, wherein if vehicle speed is higher than vehicle speed, the second relative speed signal is displayed as a negative number, wherein if vehicle speed is lower than vehicle speed, the second relative speed signal is displayed as a positive number, wherein if vehicle speed is higher than vehicle speed, the third relative speed signal is displayed as a negative number, wherein if vehicle speed is lower than vehicle speed, the third relative speed signal is displayed as a positive number.

* * * * *